United States Patent
Hicks (10) Patent No.: US 9,625,312 B2
(45) Date of Patent: Apr. 18, 2017

(54) LIGHT SENSOR WITH CORRELATED DOUBLE SAMPLING

(71) Applicant: INTEL CORPORATION, Santa Clara, CA (US)

(72) Inventor: Richmond Hicks, Aloha, OR (US)

(73) Assignee: Intel Corporation, Santa Clara, CA (US)

( * ) Notice: Subject to any disclaimer, the term of this patent is extended or adjusted under 35 U.S.C. 154(b) by 74 days.

(21) Appl. No.: 14/814,222

(22) Filed: Jul. 30, 2015

(65) Prior Publication Data

US 2017/0030771 A1    Feb. 2, 2017

(51) Int. Cl.
*H01L 27/00* (2006.01)
*G01J 1/46* (2006.01)

(52) U.S. Cl.
CPC ....................... *G01J 1/46* (2013.01)

(58) Field of Classification Search
CPC .................. G01J 1/46; H01L 27/00
USPC ....................................... 250/208.1
See application file for complete search history.

(56) References Cited

U.S. PATENT DOCUMENTS

| | | | |
|---|---|---|---|
| 6,124,819 A * | 9/2000 | Zhou ...................... | H03M 1/403 341/155 |
| 6,730,898 B2 * | 5/2004 | Machida ............... | G11C 27/026 250/208.1 |

| | | | |
|---|---|---|---|
| 2002/0036700 A1 | 3/2002 | Merrill | |
| 2004/0021057 A1 | 2/2004 | Drowley | |
| 2010/0002111 A1 | 1/2010 | Yourlo et al. | |
| 2012/0104228 A1 | 5/2012 | Souchkov | |

FOREIGN PATENT DOCUMENTS

WO    WO 99-44359    9/1999

OTHER PUBLICATIONS

PCT International Search Report and Written Opinion of the International Searching Authority for International Application No. PCT/US2016/034843, dated Sep. 12, 2016, 17 pages.

* cited by examiner

*Primary Examiner* — Seung C Sohn
(74) *Attorney, Agent, or Firm* — Blakely, Sokoloff, Taylor & Zafman LLP (57) ABSTRACT

A light sensor is described with correlated double sampling. In one example a first storage element is coupled to a photodetector to collect free electrons as an accumulated charge. A transfer switch is coupled to the first storage element. A second storage element is coupled to the first storage element through the transfer switch to collect the accumulated charge from the first storage element when the transfer switch is open. A sense circuit measures the charge on the second storage element before the accumulated charge is collected from the first storage element as a reference charge and measures the charge on the second storage element after the accumulated charge is collected from the first storage element as a read charge. The sensed charge is determined by comparing the reference charge to the read charge.

20 Claims, 7 Drawing Sheets

FIG. 9

LIGHT SENSOR WITH CORRELATED DOUBLE SAMPLING

FIELD

The present disclosure relates to the field of photodetectors for image sensors and in particular to a system and method with correlated double sampling.

BACKGROUND

Photodetectors typically use a material which absorbs incident light and produces a free electron or electron/hole pair in response to the absorbed light. The number of free electrons depends on the amount of light incident on the material and the efficiency of material used by the photodetector to produce the free electrons.

The detail of any image produced by an array of photodetectors is determined by the accuracy of each photodetector and the total number of photodetectors, usually stated in terms of megapixels. For many applications, the market demands cameras with ever increasing detail in an ever smaller size package. To provide more detail for an image sensor as well as to provide smaller image sensors, the photodetector at each pixel must be made smaller. As each pixel becomes smaller, the number of free electrons that it can produce in a particular interval of time is reduced. The smaller number of free electrons reduces the accuracy of the photodetector and also increases the impact of noise.

Any semiconductor device suffers from leakage current and other effects that cause a small number of free electrons to be continually produced and conveyed through the material. The number of free electrons is small, but they may appear at almost any place in a semiconductor circuit and structure. When these free electrons are mixed with the free electrons from a photodetector, the leakage electrons cause seemingly random variations in the apparent outputs of the photodetectors. When the photodetectors are large and produce a large output, then the noise is small and may be ignored. However, the results from smaller pixels with fewer electron outputs may be significantly affected by the noise electrons.

Photodiode based imagers are the predominant type used for image sensors for large and small camera systems. The pixels in these images have been reduced in size to enable higher resolution cameras for small devices such as cellular telephones, security cameras, and portable cameras. Current ~1 µm size pixels are near to a limit in terms of manufacturability and ability to produce a signal that is acceptably larger than the noise threshold. Smaller size pixels also are less sensitive to longer wavelengths as the pixel size approaches the wavelength of the light being measured.

Other types of imagers use either quantum dots or organic films as the active element to convert incident light into free electrons. In the quantum dots example, dots are applied to a surface, for example as colloids dispersed in a film. The generated free electrons are then measured using electrodes coupled with circuitry that may be formed in a conventional silicon substrate. The quantum dot film or quantum film may be fabricated so that a pixel converts light into free electron/hole pairs improving sensitivity, especially to longer wavelengths. However, charge collection and read out circuitry associated with the quantum film pixel also produce more noise.

BRIEF DESCRIPTION OF THE DRAWINGS

Embodiments are illustrated by way of example, and not by way of limitation, in the figures of the accompanying drawings in which like reference numerals refer to similar elements.

DETAILED DESCRIPTION

As described herein, high read noise in a photodetector circuit is corrected. This is done using a read-out circuit and methodology that allows the correlated noise, including reset noise, to be compensated. The techniques are particularly useful in quantum film and organic sensors but may be applied to other photodetector systems that decouple the charge conversion element from the pixel circuitry.

A film of quantum dots may be configured to act as a charge generator. When a photon of sufficient energy strikes a quantum dot in the film an electron/hole pair is freed. If there is no electric field applied to the region of the film then the electron and hole will quickly recombine. The film may be connected to a charge storage element, such as a capacitor. The storage element can be used both to apply an electric field to collect the free electrons and to store the resulting charge.

A variety of different circuit configurations can be used to collect the electrons into the storage element and to determine the amount of the collected charge. In one example, a reset transistor is first turned on to drain any accumulated charge from the storage element and to set that storage node to a known voltage. The reset transistor is then switched off to collect electrons from photodetector.

An optional transfer transistor is then turned on to connect the storage element to the quantum film of a photodetector. While not required, the transfer transistor enables electronic control of the exposure, which is useful in some applications. When the film is connected to the storage element, any charge generated in the film is then swept into the storage element reducing the voltage on the storage node. The voltage on the storage node is reduced proportionally to the number of freed electrons in the film, which is proportional to the number of photons that have been absorbed by the film. The transfer transistor is then switched off to isolate the storage element from the film and stop the collection of charge. To obtain an amplitude or illumination value for the photodetector, the voltage at the storage element is read.

This read value may then be used as the amplitude or light intensity at the particular photodetector. Millions of such photodetectors may be combined to form an image sensor. Typically there will be separate photodetectors for red, green, and blue light. In some cases, all of the photodetectors are used to detect the same color for infrared or black and white imaging.

The accuracy of the reading depends on the accuracy of the original reset voltage and the accuracy of the storage element in resetting and in collecting electrons only from the photodetector. In order to improve the accuracy, the storage element can be reset a second time after the reading is taken. The second reset voltage at the storage element is read and compared to the read value as a way to normalize the reading. There is, however, a variation in the voltage on the storage element after a reset. Since two different resets are used, any difference between the two reset voltages causes an unknown variation in the result which results in noise.

It has been observed that a typical 1.1 µm pixel sensor based on quantum film produces more free electron/hole pairs more quickly than a traditional photodiodes. This provides higher contrast for more detail and a better response in low light. On the other hand, the noise level is much higher so that the improved detail is obscured by the noise.

Figure 1:
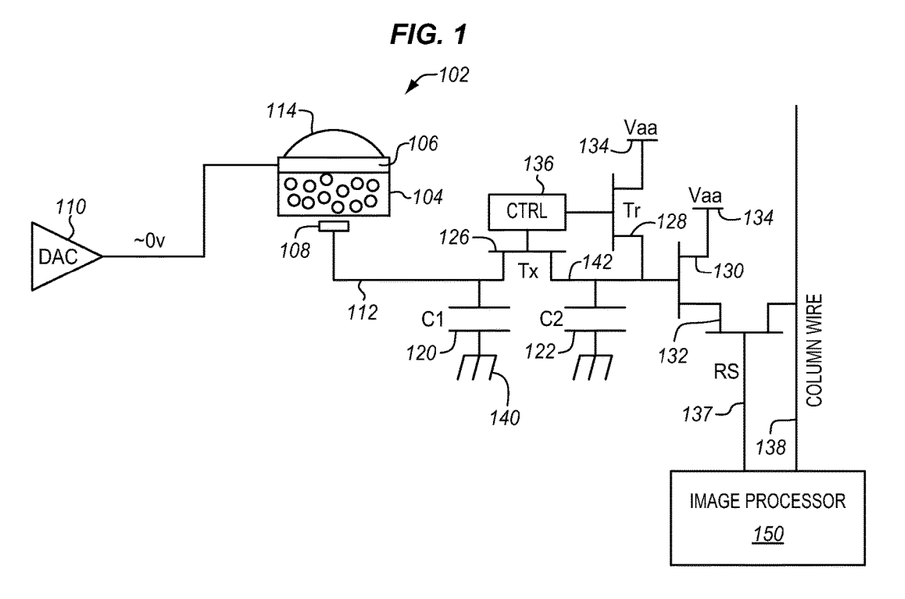
FIG. 1 is a diagram of a photodetector circuit for a single pixel with a sensor, circuitry, and other components according to an embodiment.

FIG. 1 is a diagram of a photodetector circuit for a single pixel with a sensor, circuitry, and other components, suitable for use with a quantum dot film sensor and other charge producing photodetector technologies. The illustrated system provides correlated double-sampling and a much lower read noise.

A photodetector element 102 is based around the use of quantum dots to generate a charge. The quantum dots are provided as a colloid in a film 104 that is contained between a top electrode 106 and a bottom electrode 108. The top electrode is set at a precise known voltage such as 0V using a DAC (Digital to Analog Converter) 110 or any other suitable device. The bottom electrode is coupled to an output line 112 and is allowed to float. Light incident on the photodetector passes optionally through a micro-lens 114 and through the top electrode 106, which may be transparent, to the quantum dots in the film 104.

The light interacts with the film to produce free electron/hole pairs as discussed above which may be collected at the bottom output 112 through the bottom electrode 108. The lens 114 may be used to focus optical energy onto the area containing the quantum film. The lens may also include a color filter for infrared, red, green, or blue light. There may be additional filters, such as anti-aliasing filters, ultraviolet filters, etc. While only one photodetector is shown, there may be many more to create an image sensor or another type of sensor for any of a variety of different uses. There may also be additional components, such as additional optical elements, exposure controls, protective covers, electrical components, etc. While a quantum film-based detector is shown, other types of photodetector components may be used instead of or in addition to the quantum film detector.

The output of the photodetector is coupled to a circuit for measuring the charge produced by the detector. This circuitry may be beside the photodetector as shown or some or all of the circuitry may be beneath the photodetector so that the circuitry does not interfere with the operation of neighboring photodetectors.

The measuring circuit has two storage elements 120, 122 (C1, C2) in parallel. These are shown as capacitors, however, they may also be any other suitable circuitry that stores a charge. The storage elements are coupled on one side to a common 140 or ground potential and on the other side to an output line 142 that is connected to the photodetector output 112. A transfer switch 126 (Tx) is coupled between the first storage element and the second storage element.

The output line 142 is also coupled to a reset switch 128 (Tr) connected to alternately connect or disconnect the storage elements to a reference voltage 134 (Vaa). The output line is also coupled through a buffer 130 to a row select switch 132 (Rs) which is coupled to a read line 138. The read line may be a column read or a row read, depending on the implementation, to allow the read voltage to be transferred to a central buffer as the amplitude value for the pixel.

The switches are all coupled to a controller 136 to control the timing and operation of the switches. While the switches are all shown as simple transistors, other and more complex forms of switches may be used. Additional filters, switches, control lines and other elements may be added to the circuit shown, depending on the implementation. The single circuit may share components with other pixel circuits and may be coupled to other pixel circuits to form an image sensor. The structures and techniques described herein may be applied to a single photodetector, millions of photodetectors, or any other number in between.

Each of the photodetectors, such as the one 102 shown are coupled to a common image processor 150. The image processor is coupled to the row 137 and column 138 lines and controls the reading of each pixel. The image processor reads the value of the pixel circuit and combines these values for all of the pixels to generate an image file. The image processor may also control the controller 136, which controls the operation of the circuit. The image processor may perform other operations including noise reduction, format conversion, storage, image modification for special effects and others.

The illustrated circuit may be modified to suit different implementations. As an example, the reset transistor 128 may be moved to the first storage node 120. In addition, all of the circuitry except the transfer switch 126 may be shared by multiple pixels. Each photodetector may have a unique transfer switch to connect or disconnect the photodetector to the shared circuit. In such an implementation the photodiode values are read in sequence. Either approach may be used, depending on the intended use of the image sensor. For a global shutter operation the pixels are sensed or sampled at the same time.

Figure 2:
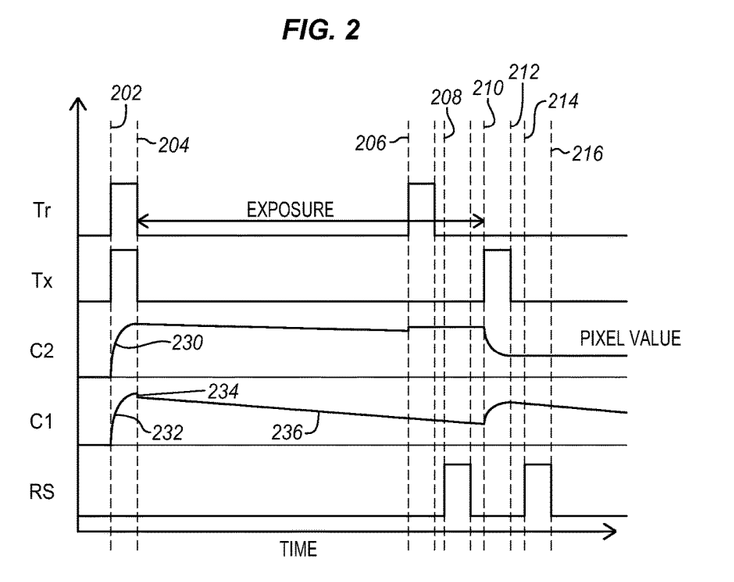
FIG. 2 is a timing diagram of an example operation cycle for the circuit of FIG. 1 according to an embodiment.

FIG. 2 is a timing diagram to show one example of the operation of the circuit. In FIG. 2, time is on the horizontal axis from left to right and voltage is on the vertical axis with a separate scale for each pixel. The sequence is repeated for each image capture. To capture a video for example, the sequence may be repeated 24 or 30 times per second or more.

The sequence for the circuit begins at the origin 202 with all signals set low, although the state of C1 and C2 may still be indeterminate. The initial state of C1 and C2 are not important as described further herein. The photodetector may be accumulating charge with exposure to light at this time. At the first time step 204, both the reset transistor Tr and the transfer transistor Tx are switched high by the controller. As a result, these gates are opened. This couples the collection side of both storage capacitors C1, C2 to the reference voltage Vaa. The result is to reset both capacitors by draining any accumulated charge from both the C1 and C2 nodes. The capacitors are changed from some indeterminate state (shown as zero, but not necessarily zero) to a reset voltage.

The capacitor voltage rises slowly as the capacitors accumulate charge from the reference reset voltage Vaa. This is shown as the voltage rise curves 230, 232 for each capacitor. The curves start with a steep slope and then level off and will increase asymptotically toward the reset voltage. The specific response will vary slightly between the two capacitors and depend on the quality of the connection to the reset voltage 134 as well as any leakage currents that may exist in the system. The reset voltage of the second storage node C2 122 will naturally vary each time the storage capacitors are reset. The change in voltage from reset to reset introduces an unknown variation in the value read from the second capacitor C2 122.

The two capacitors serve as floating diffusion wells. The first capacitor may be designed so that it acts as a fully depleted charge well after being coupled to the reset voltage. In this way there is no charge in the well. The voltage may or may not be well-defined or determined and as described below, it is also not necessary to measure the voltage in the first capacitor. The capacitor may also be configured so that it has a finite amount of charge storage after which it becomes resistive. While this capacitor is used to collect charge, it is not used to measure the voltage.

The second capacitor, also a floating diffusion well, may or may not be a fully depleted well. This capacitor has a defined and measurable voltage after being reset. This voltage is measured, and then the charge from the first well is transferred to the second well through the transfer switch. The voltage of the second well is measured again after the charge transfer. The transfer switch Tx is fully charge transferring so that the first well is depleted and all or almost all of the charge from the first well is transferred to the second well.

The two well configuration allows the two wells to each be optimized for their assigned function. The image processor measures and stores voltages, but the photodetector produces charge. The first well may be specialized for collecting charge from the photodetector. If the first well is fully depleted after reset then all of the charge is attributable to the photodetector. This is very useful for photodetectors that produce only a small amount of charge due to size or the darkness of the scene being imaged. The second well may then be optimized for accurate voltage measurements to convert the transferred charge to a measurable voltage. The specific physical characteristics of these two charge storage nodes may be adapted to any of a variety of different size, cost, packaging and materials constraints.

At the next time step 206, the controller releases the reset. Both the reset transistor Tr and the transfer transistor Tx are closed. The voltage at the first capacitor C1 node drops down to a lower value that depends on the total charge capacity of the capacitor. This voltage is the same each time, but not known for every pixel. In other words, each time the storage element is fully depleted it will return to the same voltage, but each pixel will have a different voltage. This drop is indicated at 234. C2 in contrast is not operated in a fully depleted mode and therefore the voltage does not drop when the reset is released. It is, however, subject to variations in reset voltage. This variation will be accounted for later in the process by means of correlated double-sampling At 204, the reset switch Tr and the transfer switch Tx are closed. The first capacitor C1 is connected to the photodetector output 112, e.g. the quantum film. Any charge generated by the quantum film is swept into the C1 node where it is accumulated and reduces the voltage of the C1 node. This is shown as a steady drop in C1 voltage at 236. The second capacitor C2 is not affected because the transfer transistor Tx is closed. The second capacitor C2 node may leak during this interval without impacting the performance of the pixel as explained later in the sequence.

At 206, the reset transistor Tr is turned on again, this time with the transfer gate Tx off. As a result, the C2 node voltage is reset again. Any charge accumulated during the exposure time (not shown) due to leakage is removed and the C2 node is restored to the reset voltage. As before, this reset voltage is still not known with certainty.

At the next time step 208, the row select switch Rs is opened and the reset voltage is read from C2. Because the signal is passed through a high impedance buffer 130, the value of the C2 node is not changed. This read provides the actual reset value at the relevant time including any uncontrolled variation in level. This is the reference voltage that is used to convert the read charge collected from the first storage element 120 into voltage.

At the next step 210, the row select switch is closed and the controller opens the transfer switch Tx. The charge at the C1 node is transferred from the C1 node to the C2 node when the Tx gate is opened. This is the read charge at the C2 node from the C1 node. The read charge is converted to voltage based on the capacitance of the C2 node. In addition, because the read charge is transferred to the C2 node, the voltage at the C2 node does not depend on the unknown C1 reset voltage. The C2 reset voltage has just been read as a reference and is known.

At the next time step 212, the transfer switch is closed. This may be timed so that the first storage node has been fully transferred into the second node. At 214, the voltage of the second storage capacitor C2 corresponding to the read charge is read again by opening the row select switch. The new voltage reading is compared to the previously stored reset value or reference. The difference is used as the final pixel voltage value or the sensed charge in that it corresponds to the charge sensed by the photodetector. At time step 216 all of the switches are closed and the system is ready to be reset for the next sample. Since both voltages are read from the same capacitor at almost the same time, time steps 208 and 212, this represents true correlated double sampling with the reference and the read values. The correlated double sampling provides a significant reduction in the read noise.

Figure 3:
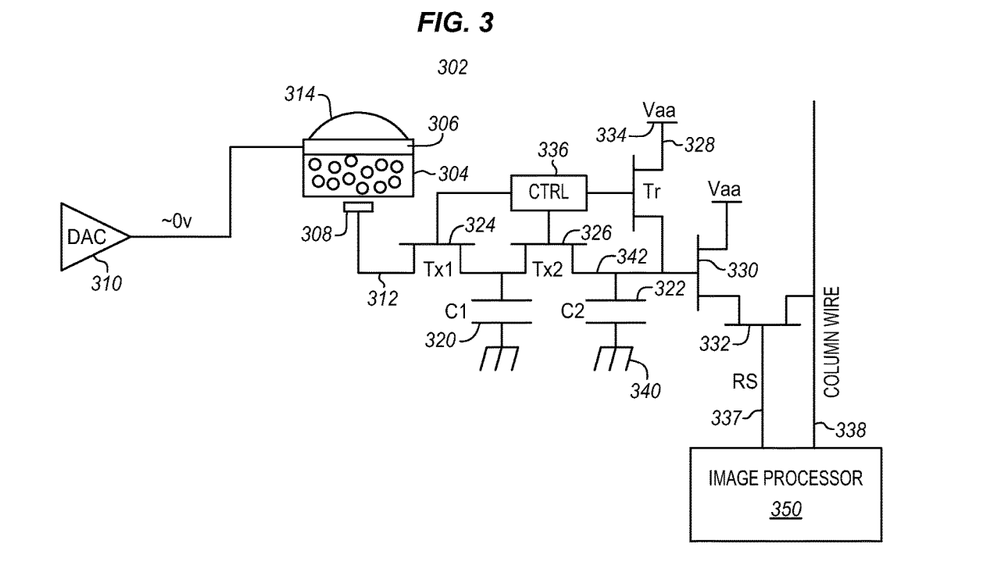
FIG. 3 is a diagram of an alternative photodetector circuit for a single pixel with a sensor, circuitry, and other components according to an embodiment.

The reading and comparing of the voltages for each pixel is performed at the image processor 150. There are many different implementations that may be used for the voltage read and compare system, including those for CCD and CMOS-based image sensors FIG. 3 is a diagram of an alternative single pixel with sensor, circuitry, and other components. This alternative also provides correlated double-sampling and a much lower read noise using two transfer switches 324, 326.

A photodetector element 302 has a charge-producing element such as a film 304 that is contained between a top electrode 306 and a bottom electrode 308. The top electrode is set at a precise known voltage such as 0V using a DAC (Digital to Analog Converter) 310. The bottom electrode is coupled to an output line 312. A micro-lens 314 directs light through a top electrode 306, to the film 304. The resulting charge is collected at the bottom output 312 through the bottom electrode 308.

The measuring circuit has two storage elements 320, 322 (C1, C2) in parallel. These capacitors, or other charge storage devices, may be configured differently as in FIG. 1 so that one is optimized for charge measurement and the other for voltage measurement. They are coupled on one side to ground 340 and on the other side to an output line 342 that is connected to the photodetector output 312.

A first optional transfer switch 324 (Tx1) is placed between the photodetector output and the first storage element for the purposes of controlling the exposure time of the pixel. A second transfer switch 326 (Tx2) is coupled between the first storage element and the second storage element.

The output line 342 is also coupled to a reset switch 328 (Tr) connected to alternately connect or disconnect the storage elements to a reference voltage 334 (Vaa). The output line is also coupled through a buffer 330 to a row select 332 (Rs) which is coupled to a read line 338. The row and column select lines 337, 338 are coupled to an image processor to collect pixel values for all of the pixels of the image sensor.

The switches are all coupled to a controller 336 to control the timing and operation of the switches. The additional transfer switch (Tx1) 324 may be used to precisely control the time of exposure and also to provide a global shutter operation. For the global shutter, an exposure is taken at all of the pixels of the image sensor at the same time. A rolling shutter operation allows exposures to be taken at different pixels at different times usually in groups.

Figure 4:
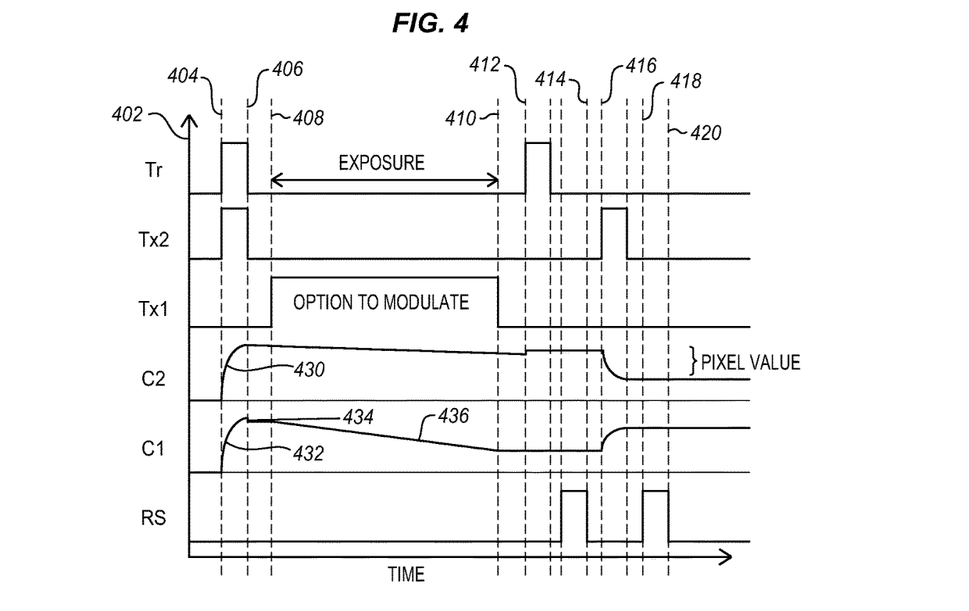
FIG. 4 is a timing diagram of an example operation cycle for the circuit of FIG. 3 according to an embodiment.

FIG. 4 is a timing diagram to show an example of the operation of this alternative circuit in which time is on the horizontal axis from left to right and voltage is on the vertical axis with a separate scale for each pixel.

The circuit begins at the origin 402 with all signals set low. As in the example of FIG. 2, the state of C1 and C2 may still be indeterminate. The photodetector may be accumulating charge with exposure to light at this time. At the first time step 404, both the reset transistor Tr and the second transfer transistor Tx2 are switched high by the controller. As a result, these gates are opened. This couples the collection side of both storage capacitors C1, C2 to the reference voltage Vaa to reset both capacitors by draining any accumulated charge from both the C1 and C2 nodes. The capacitor voltage rises as shown in curves 430, 432 for each capacitor.

At the next time step 406, the controller releases the reset. Both the reset transistor Tr and the second transfer transistor Tx2 are closed. The voltage at the first capacitor C1 node drops down to a lower value that depends on the total charge capacity of the capacitor. This drop is indicated at 434. At the next time step 408, the controller opens the first transfer transistor Tx1. When this gate is opened the first capacitor is connected to the photodetector output 112, e.g. the quantum film. Any charge generated by the photodetector while the gate is open is swept into the C1 node where it is accumulated and reduces the voltage of the C node. This is shown as a steady drop in C1 voltage at 436. This sample time of the transfer switch Tx1 may be used as a shutter speed in some implementations. The TX1 gate may also be used to control or modulate the exposure in some applications.

The second capacitor C2 is not affected because the second transfer transistor Tx2 is closed. The second capacitor C2 node may leak during this interval without impacting the performance of the pixel as explained later in the sequence.

After the end 410 of the exposure period the first transfer switch is closed and the next step 412 begins. The reset transistor Tr is turned on again, this time with the Tx2 gate off. As a result, the C2 node maintains its collected charge. Any charge accumulated during the exposure time (not shown) due to leakage is removed and the C2 node is restored to the reset voltage. As before, this reset voltage is still not known with certainty.

At the next time step 414, the row select switch Rs is opened and the reset voltage is read from C2 to provide a reference value. Because the signal is passed through the high impedance buffer 330, the value of the C2 node is not changed. This read provides the actual reset value at the relevant time including the uncontrolled variation in level as a reference charge.

At the next step 416, the row select switch is closed and the controller opens the second transfer switch Tx2 while the first transfer switch Tx1 remains closed. The charge at the C1 node is transferred from the C1 node to the C2 node when the Tx2 gate is opened. The charge is converted to voltage based on the capacitance of the C2 node. In addition, because the charge is transferred to the C2 node, the voltage at the C2 node does not depend on the unknown C1 reset voltage. The C2 reset voltage has just been read and is known.

At the next time step 418, the voltage of the second storage capacitor C2 is read as a voltage corresponding to the read charge from C1 and compared to the stored reset value by the image processor 350. The difference is used as the final pixel value and is the voltage corresponding to the sensed charge from the photodetector. At time step 420 all of the switches are closed and the system is ready to be reset for the next sample.

Figure 5:
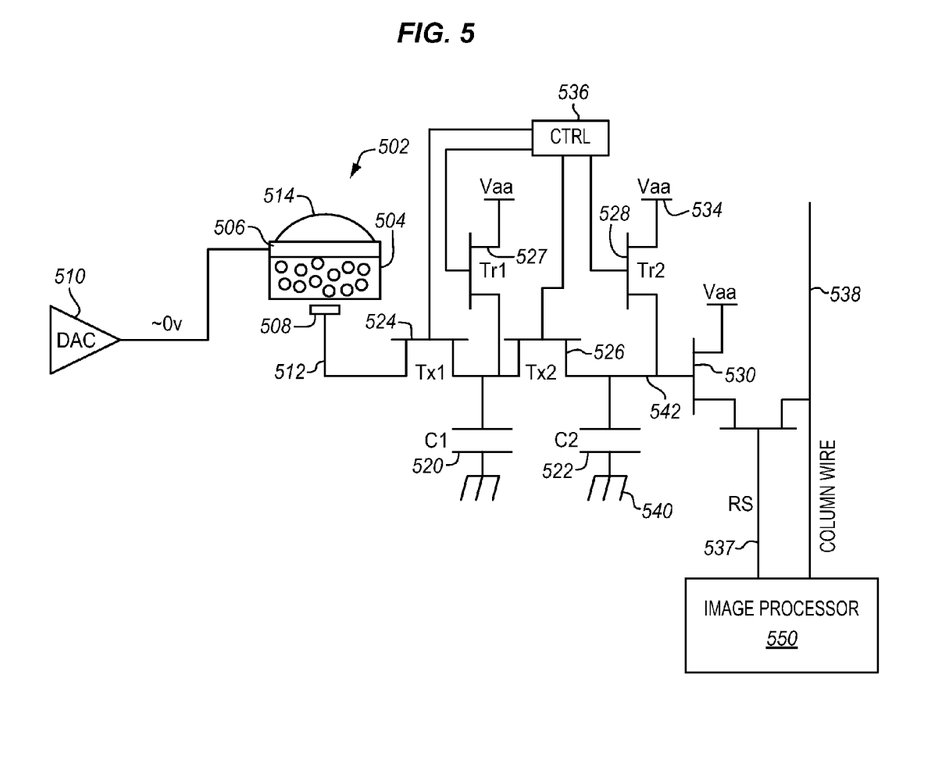
FIG. 5 is a diagram of another alternative photodetector circuit for a single pixel with a sensor, circuitry, and other components according to an embodiment.

FIG. 5 is a diagram of another alternative single pixel with sensor, circuitry, and other components, suitable for use with charge producing photodetector technologies. The illustrated system provides an additional reset switch 527 for the node between the two charge storage devices C1, C2. This additional reset switch is particularly useful for pipelined global shutter operation. The exposure time for the pipelined global shutter may be controlled by the optional transfer switch Tx1.

A photodetector element 502 has a charge producing area 504 between a top electrode 506 and a bottom electrode 508. The top electrode voltage is set by a DAC (Digital to Analog Converter) 510 or any other suitable device. The bottom electrode 508 is coupled to an output line 512 and is allowed to float. A micro-lens 514 directs impinging illumination from a scene through a top electrode 506 to the sensor area 504.

A bottom output 512 is coupled to the bottom electrode 508 which is coupled to a first charge storage element (C1) 520 through a first transfer switch (Tx1). The first storage element and a second storage elements 522 (C2) are coupled in parallel with a common ground on one side and an output line 542 on the other. The first optional transfer switch 524 (Tx1) is placed between the photodetector output and the first storage element for the purposes of controlling the exposure time of the pixel. A second transfer switch 526 (Tx2) is coupled between the first storage element and the second storage element.

The output line 542 is coupled between the two transfer switches 524, 526 to a first reset switch (Tr1) 527. The output line 542 is also coupled to a second reset switch 528 (Tr2). The reset switches alternately connect or disconnect the storage elements to a reference voltage 534 (Vaa). The output line is also coupled through a buffer 530 to a row select 532 (Rs) controlled by a select line 537. The output of the row select is coupled to a column line 538. The row and column lines are coupled to an image processor 550 for controlling the operation of the circuit. The other switches are coupled to a controller 536 to control the timing and operation of the switches. This controller may be a part of the image controller or a separate controller that operates under the control of the image controller.

Figure 6:
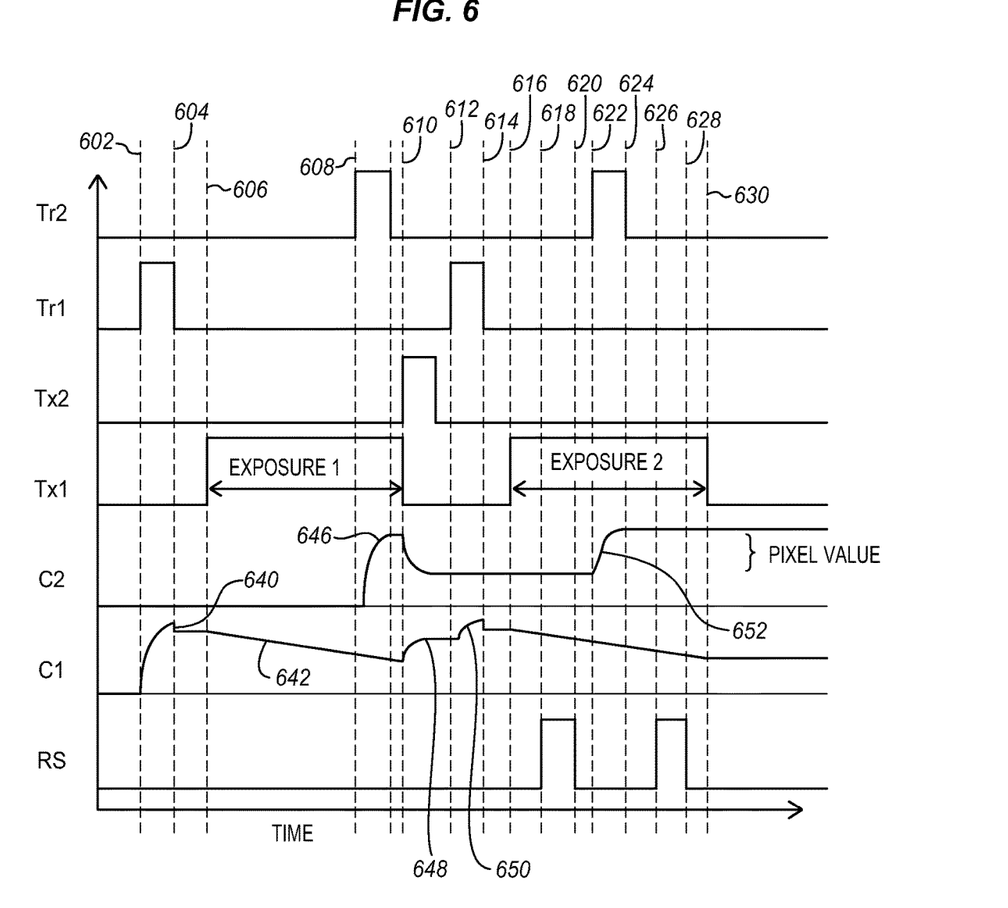
FIG. 6 is a timing diagram of an example operation cycle for the circuit of FIG. 5 according to an embodiment.

FIG. 6 is a timing diagram with time on the horizontal axis and voltage on the vertical axis for different parts of the system to show one example of the operation of the circuit of FIG. 5. This operation uses the two reset switches to provide a pipelined global shutter operation. The circuit of FIG. 5 may also be used to perform the operations of FIG. 4 by closing Tr1 and operating Tr2 as Tr of FIG. 3. Similarly, the operations of FIG. 2 may be performed by also opening Tx1 and operating Tx2 as Tx of FIG. 1. In the same way the circuit of FIG. 3 may be used to perform the operations of FIG. 2 by opening Tx2 and operating Tx1 as Tx of FIG. 1. Many other operations, cycles, and methods not shown here may also be performed with the illustrated circuits. The timing diagrams are shown only as examples of how two storage elements may be used to reduce noise and increase operational system flexibility in an image sensor.

The circuit begins at the origin with all signals set low, although the state of C1 and C2 may still be indeterminate. At the first time step the first reset transistor Tr1 is set high while the second reset transistor stays closed. As a result, the first storage element is coupled to the reference voltage Vaa. The first storage element is reset and is then ready to measure an exposure from the photodetector. The second storage element is isolated from all of this by the transfer switches, which are both closed.

At the next time step 604, the controller releases the first reset switch. As in the other examples, the voltage at the first capacitor C1 node drops down to a lower value shown at 640. However, the capacitor has been fully depleted so that the charge is zero or near zero.

At 606 the first transfer switch Tx1 is opened to connect the first storage element to the photodetector. The first capacitor is connected to the photodetector output 512 so that the charge generated by the photodetector while the gate is open is swept into the C1 node where it is accumulated and reduces the voltage of the C node. This is a first exposure shown as the steady drop in C1 voltage at 642. The Tx1 gate is being used as a shutter to control or modulate the exposure time.

The second capacitor C2 has not yet been affected because the second transfer transistor Tx2 has been closed during this exposure. During the exposure at 610 with Tx2 still closed, the second rest switch is opened. The C2 node is restored 646 to the reset voltage during the exposure because there are two reset switches on opposite sides of Tx2. As before, this reset voltage is still not known with certainty.

At 610, the first transfer switch Tx1 is closed ending the exposure and then the second transfer switch Tx2 is opened to transfer 648 the collected charge from C1 to C2. At 612 Tx2 is closed ending the transfer. At 614 with both transfer switches closed and the transfer to C2 completed, C1 is reset 650 for another exposure by opening Tr1.

At 616 Tx1 is opened again allowing for another exposure and charge is transferred from the detector to C1. During this exposure C2 is isolated from the exposure by Tx2. Accordingly at 618 with Tx2 closed the row select switch Rs is opened and a voltage corresponding to the read charge collected from C1 at 610 is read. At 620 this reading is ended by closing Rs. C2 is then reset using Tr2 at 622. This may still be done during the second exposure. At 624, C2 is reset 652 allowing for a reading at 626 of the reference reset voltage. The Rs switch is again opened to read the reset voltage. The difference between these two reads is then the voltage value for the sensed charge for the first exposure. The second exposure may continue through the end of the second reading at 628 to some other later time 630.

As shown in FIG. 6, by using the two independent reset switches 527, 528 and isolating the two storage nodes 520, 522 with a transfer switch 526, exposures, that is transfers from the photodiode 502 to the first storage node 520 may be isolated from reading and resetting the second storage node 522. The second storage node may then be read and reset during charge transfers into the first storage node.

For a global shutter operation all of the exposures into the first storage node may be taken for all of the pixels at the same time. All of the charge transfers from the first storage node to the second storage node and the resets of the first storage node may be done at the same time. The system may then read the exposure values from the second storage nodes for all of the pixels serially and independent of the exposures. This allows the shared image processor 150 to read the exposure values as a background process even as exposures are being made and the first storage element is being reset.

Figure 7:
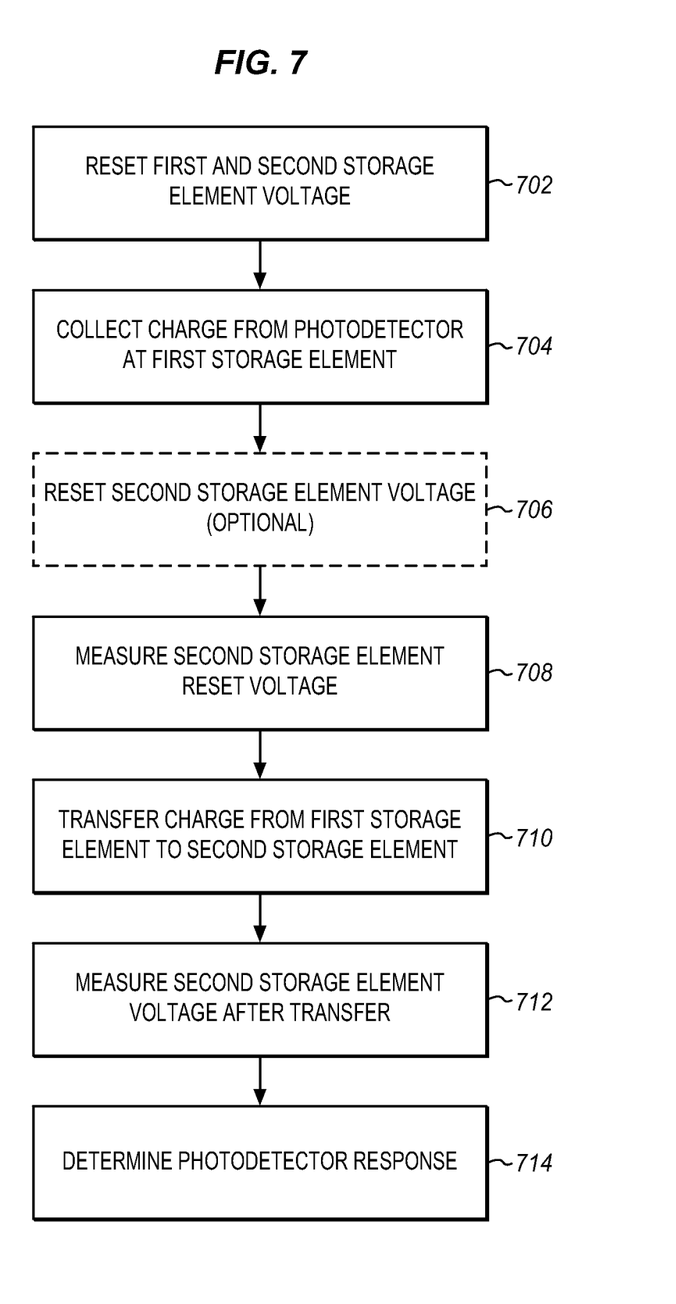
FIG. 7 is a process flow diagram of the timing of a photodetector circuit according to an embodiment.

FIG. 7 is a process flow diagram of the timing shown in FIG. 4. However, this process flow also applies to the timing shown in FIGS. 2 and 6. The process begins at 702 with resetting the voltage of a first storage element and a second storage element to a single reset voltage. This may be done for example, by connecting the first and the second storage elements through a reset transistor to a reference voltage. In FIG. 6, these two operations are performed independently using separate reset switches, one for each storage element.

At 704, the charge from a photodetector is collected at the first storage element. As shown in FIG. 3, the charge may be collected by opening a first transfer transistor between the first storage element and the photodetector and closing a second transfer transistor between the first storage element and the second storage element. However the first transfer transistor is optional. Charge may be collected simply by releasing the reset as in FIG. 2.

After the charge is collected, then the voltage of the second storage element is optionally reset at 706 before transferring the charge. This provides more accuracy for noise reduction and may be done while the first storage element remains disconnected from any other components. As shown in FIG. 6, this reset may also be performed after reading the voltage of the transferred charge.

At 708 the reset voltage at the second storage element is measured. This will be referred to as the first voltage and may be detected by opening a row select transistor between the second storage element and a column wire coupled to a voltage read circuit such as an image processor or an analog to digital component before the image processor.

At 710 the collected charge from the first storage element is transferred to the second storage element. At 712 the voltage at the second storage element resulting after transferring the charge to the second storage element is measured. This is the second voltage. The charge can be transferred by closing the first transfer transistor between the first storage element and the photodetector and opening the second transfer transistor between the first storage element and the second storage element.

At 714 the photodetector response is determined based on a difference between the first voltage and the second voltage. As described above, the first voltage provides a reference while the second voltage adds the collected charge to that reference. This provides a noise reduced pixel value count.

Figure 8:
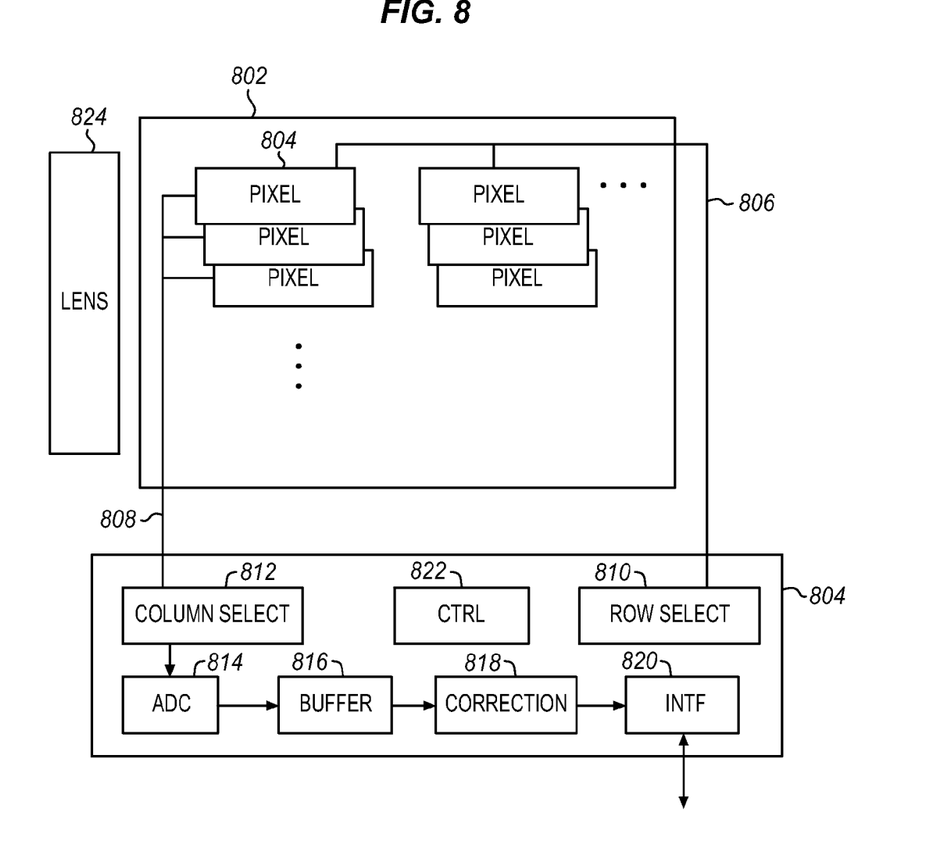
FIG. 8 is a block diagram of an image sensor with multiple photodetectors and circuits according to an embodiment.

FIG. 8 is a block diagram of an image sensor or camera system 800 that may include pixel circuits with two charge storage elements as described herein. The camera 800 includes an image sensor 802 with millions of pixels typically arranged in rows and columns. Each pixel may have a micro-lens and detector coupled to a circuit as described above. Each pixel is coupled to a row line 806 and a column line 808. These are applied to the image processor 804.

The image processor has a row selector 810 and a column selector 812. The voltage on the column line is fed to an ADC (Analog to Digital Converter) 814 which may include sample and hold circuits and other types of buffers. The ADC values are fed to a buffer 816, which holds the values for each exposure to apply to a correction processor 818. This processor may compensate for any artifacts or design constraints of the image sensor or any other aspect of the system. The complete image is then compiled and rendered and may be sent to an interface 820 for transfer to external components.

The image processor 804 may be regulated by a controller 822 and contain many other sensors and components. It may perform many more operations than those mentioned or another processor may be coupled to the camera or to multiple cameras for additional processing. The controller may also be coupled to a lens system 824. The lens system serves to focus a scene onto the sensor and the controller may adjust focus distance, focal length, aperture and any other settings of the lens system, depending on the particular implementation.

Figure 9:
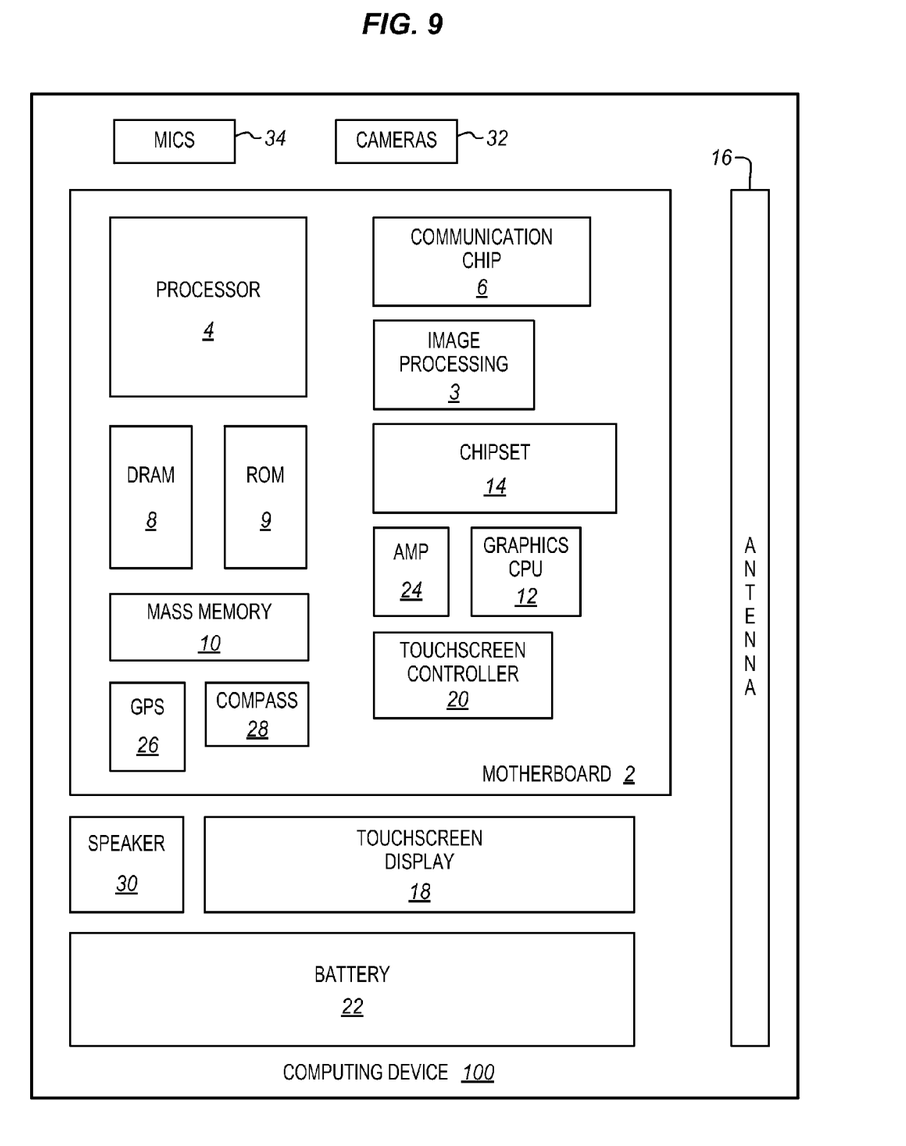
FIG. 9 is a block diagram of a computing device incorporating interactive video presentation according to an embodiment.

FIG. 9 is a block diagram of a computing device 100 in accordance with one implementation. The computing device 100 houses a system board 2. The board 2 may include a number of components, including but not limited to a processor 4 and at least one communication package 6. The communication package is coupled to one or more antennas 16. The processor 4 is physically and electrically coupled to the board 2.

Depending on its applications, computing device 100 may include other components that may or may not be physically and electrically coupled to the board 2. These other components include, but are not limited to, volatile memory (e.g., DRAM) 8, non-volatile memory (e.g., ROM) 9, flash memory (not shown), a graphics processor 12, a digital signal processor (not shown), a crypto processor (not shown), a chipset 14, an antenna 16, a display 18 such as a touchscreen display, a touchscreen controller 20, a battery 22, an audio codec (not shown), a video codec (not shown), a power amplifier 24, a global positioning system (GPS) device 26, a compass 28, an accelerometer (not shown), a gyroscope (not shown), a speaker 30, a camera 32, a microphone array 34, and a mass storage device (such as hard disk drive) 10, compact disk (CD) (not shown), digital versatile disk (DVD) (not shown), and so forth). These components may be connected to the system board 2, mounted to the system board, or combined with any of the other components.

The communication package 6 enables wireless and/or wired communications for the transfer of data to and from the computing device 100. The term "wireless" and its derivatives may be used to describe circuits, devices, systems, methods, techniques, communications channels, etc., that may communicate data through the use of modulated electromagnetic radiation through a non-solid medium. The term does not imply that the associated devices do not contain any wires, although in some embodiments they might not. The communication package 6 may implement any of a number of wireless or wired standards or protocols, including but not limited to Wi-Fi (IEEE 802.11 family), WiMAX (IEEE 802.16 family), IEEE 802.20, long term evolution (LTE), Ev-DO, HSPA+, HSDPA+, HSUPA+, EDGE, GSM, GPRS, CDMA, TDMA, DECT, Bluetooth, Ethernet derivatives thereof, as well as any other wireless and wired protocols that are designated as 3G, 4G, 5G, and beyond. The computing device 100 may include a plurality of communication packages 6. For instance, a first communication package 6 may be dedicated to shorter range wireless communications such as Wi-Fi and Bluetooth and a second communication package 6 may be dedicated to longer range wireless communications such as GPS, EDGE, GPRS, CDMA, WiMAX, LTE, Ev-DO, and others.

The cameras 32 contain image sensors with pixels or photodetectors as described herein. The image sensors may use the resources of an image processing chip 3 to read values and also to perform format conversion, coding and decoding, noise reduction and 3D mapping, etc. The processor 4 is coupled to the image processing chip to drive the processes, set parameters, etc.

In various implementations, the computing device 100 may be eyewear, a laptop, a netbook, a notebook, an ultrabook, a smartphone, a tablet, a personal digital assistant (PDA), an ultra mobile PC, a mobile phone, a desktop computer, a server, a set-top box, an entertainment control unit, a digital camera, a portable music player, or a digital video recorder. The computing device may be fixed, portable, or wearable. In further implementations, the computing device 100 may be any other electronic device that processes data.

Embodiments may be implemented as a part of one or more memory chips, controllers, CPUs (Central Processing Unit), microchips or integrated circuits interconnected using a motherboard, an application specific integrated circuit (ASIC), and/or a field programmable gate array (FPGA).

References to "one embodiment", "an embodiment", "example embodiment", "various embodiments", etc., indicate that the embodiment(s) so described may include particular features, structures, or characteristics, but not every embodiment necessarily includes the particular features, structures, or characteristics. Further, some embodiments may have some, all, or none of the features described for other embodiments.

In the following description and claims, the term "coupled" along with its derivatives, may be used. "Coupled" is used to indicate that two or more elements co-operate or interact with each other, but they may or may not have intervening physical or electrical components between them.

As used in the claims, unless otherwise specified, the use of the ordinal adjectives "first", "second", "third", etc., to describe a common element, merely indicate that different instances of like elements are being referred to, and are not intended to imply that the elements so described must be in a given sequence, either temporally, spatially, in ranking, or in any other manner.

The drawings and the forgoing description give examples of embodiments. Those skilled in the art will appreciate that one or more of the described elements may well be combined into a single functional element. Alternatively, certain elements may be split into multiple functional elements. Elements from one embodiment may be added to another embodiment. For example, orders of processes described herein may be changed and are not limited to the manner described herein. Moreover, the actions of any flow diagram need not be implemented in the order shown; nor do all of the acts necessarily need to be performed. Also, those acts that are not dependent on other acts may be performed in parallel with the other acts. The scope of embodiments is by no means limited by these specific examples. Numerous variations, whether explicitly given in the specification or not, such as differences in structure, dimension, and use of material, are possible. The scope of embodiments is at least as broad as given by the following claims.

The following examples pertain to further embodiments. The various features of the different embodiments may be variously combined with some features included and others excluded to suit a variety of different applications. Some embodiments pertain to an apparatus that includes a photodetector to produce free electrons in response to incident photons, a first storage element coupled to the photodetector to collect free electrons from the photodetector as an accumulated charge, a transfer switch coupled to the first storage element, a second storage element coupled to the first storage element through the transfer switch to collect the accumulated charge from the first storage element when the transfer switch is open, and a sense circuit to measure the charge on the second storage element before the accumulated charge is collected from the first storage element as a reference charge and to measure the charge on the second storage element after the accumulated charge is collected from the first storage element as a read charge, wherein the sensed charge is determined by comparing the reference charge to the read charge.

In further embodiments the first and second storage elements comprise capacitors and wherein the sense circuit measures charge as a voltage on the capacitor of the second storage element.

In further embodiments the reference charge and the read charge are measured as a reference voltage and a read voltage and wherein the sensed charge is provided as a sensed voltage.

Further embodiments include a reset switch coupled to a reference voltage and to the first and second storage elements to reset the first and second storage elements before the first transfer switch is opened.

In further embodiments the reset switch is further to reset the second storage element after the reference charge is measured and before the read charge is measured.

In further embodiments the sense circuit measures the charge by connecting the second storage element to an analog to digital converter to convert the voltage of the second storage element to a digital measurement value.

In further embodiments the photodetector comprises a film having dispersed quantum dots to produce the free electrons.

In further embodiments the first storage element is a fully depleted charge well and the second storage element is a capacitor.

Further embodiments include a second transfer switch between the photodetector and the first storage element to alternately allow the electrons to be collected when open and prevent the electrons from being collected when closed.

Further embodiments include a first reset switch coupled between the first storage element and a reference voltage to reset the voltage of the first storage element and the second reset switch between the second storage element and the reference voltage to reset the voltage of the second storage element.

Some embodiments pertain to a method that includes resetting the voltage of a first storage element and a second storage element to a reset voltage, collecting charge from a photodetector at the first storage element, measuring the reset voltage at the second storage element as a first voltage, transferring the collected charge from the first storage element to the second storage element, measuring the voltage at the second storage element after transferring the collected charge as a second voltage, and determining the photodetector response based on a difference between the first voltage and the second voltage.

Further embodiments include resetting the voltage of the second storage element after collecting the charge and before transferring the charge.

In further embodiments resetting the voltage comprises connecting the first and the second storage element through a reset transistor to a reference voltage.

In further embodiments resetting the voltage comprises connecting the first storage element through a first reset transistor to a reference voltage and connecting the second storage element through a second reset transistor to the reference voltage.

In further embodiments collecting charge comprises opening a first transfer transistor between the first storage element and the photodetector and closing a second transfer transistor between the first storage element and the second storage element.

In further embodiments measuring the reset voltage comprises opening a read select transistor between the second storage element and a column wire coupled to a voltage read circuit.

In further embodiments transferring the charge comprises closing a first transfer transistor between the first storage element and the photodetector and opening a second transfer transistor between the first storage element and the second storage element.

Some embodiments pertain to a computing system that includes a processor, a memory to store images, and an image sensor to capture images, the image sensor having a plurality of photodetectors to produce free electrons in response to incident photons, each photodetector being coupled to a circuit, the circuit comprising a first storage element coupled to the photodetector to collect free electrons from the photodetector as an accumulated charge, a transfer switch coupled to the first storage element, a second storage element coupled to the first storage element through the transfer switch to collect the accumulated charge from the first storage element when the transfer switch is open, and a sense circuit to measure the charge on the second storage element before the accumulated charge is collected from the first storage element as a reference charge and to measure the charge on the second storage element after the accumulated charge is collected from the first storage element as a read charge, wherein the sensed charge is determined by comparing the reference charge to the read charge, wherein the sense circuit measures the charge by connecting the second storage element to an analog to digital converter of the processor to convert the voltage of the second storage element to a digital measurement value.

In further embodiments the reset switch is further to reset the second storage element after the reference charge is measured and before the read charge is measured.

In further embodiments the circuit further comprises a second transfer switch between the photodetector and the first storage element to alternately allow the electrons to be collected when open and prevent the electrons from being collected when closed.

What is claimed is:
1. An apparatus comprising:
 a photodetector to produce free electrons in response to incident photons;
 a first storage element coupled to the photodetector to collect free electrons from the photodetector as an accumulated charge;
 a transfer switch coupled to the first storage element;

a second storage element coupled to the first storage element through the transfer switch to collect the accumulated charge from the first storage element when the transfer switch is open; and a sense circuit to measure the charge on the second storage element before the accumulated charge is collected from the first storage element as a reference charge and to measure the charge on the second storage element after the accumulated charge is collected from the first storage element as a read charge, wherein the sensed charge is determined by comparing the reference charge to the read charge.

2. The apparatus of claim 1, wherein the first and second storage elements comprise capacitors and wherein the sense circuit measures charge as a voltage on the capacitor of the second storage element.

3. The apparatus of claim 2, wherein the reference charge and the read charge are measured as a reference voltage and a read voltage and wherein the sensed charge is provided as a sensed voltage.

4. The apparatus of claim 1, further comprising a reset switch coupled to a reference voltage and to the first and second storage elements to reset the first and second storage elements before the first transfer switch is opened.

5. The apparatus of claim 4, wherein the reset switch is further to reset the second storage element after the reference charge is measured and before the read charge is measured.

6. The apparatus of claim 1, wherein the sense circuit measures the charge by connecting the second storage element to an analog to digital converter to convert the voltage of the second storage element to a digital measurement value.

7. The apparatus of claim 1, wherein the photodetector comprises a film having dispersed quantum dots to produce the free electrons.

8. The apparatus of claim 1, wherein the first storage element is a fully depleted charge well and the second storage element is a capacitor.

9. The apparatus of claim 1, further comprising a second transfer switch between the photodetector and the first storage element to alternately allow the electrons to be collected when open and prevent the electrons from being collected when closed.

10. The apparatus of claim 1, further comprising a first reset switch coupled between the first storage element and a reference voltage to reset the voltage of the first storage element and the second reset switch between the second storage element and the reference voltage to reset the voltage of the second storage element.

11. A method comprising:
resetting the voltage of a first storage element and a second storage element to a reset voltage;
collecting charge from a photodetector at the first storage element;
measuring the reset voltage at the second storage element as a first voltage;
transferring the collected charge from the first storage element to the second storage element;
measuring the voltage at the second storage element after transferring the collected charge as a second voltage; and
determining the photodetector response based on a difference between the first voltage and the second voltage.

12. The method of claim 11, further comprising resetting the voltage of the second storage element after collecting the charge and before transferring the charge.

13. The method of claim 11, wherein resetting the voltage comprises connecting the first and the second storage element through a reset transistor to a reference voltage.

14. The method of claim 11, wherein resetting the voltage comprises connecting the first storage element through a first reset transistor to a reference voltage and connecting the second storage element through a second reset transistor to the reference voltage.

15. The method of claim 11, wherein collecting charge comprises opening a first transfer transistor between the first storage element and the photodetector and closing a second transfer transistor between the first storage element and the second storage element.

16. The method of claim 11, wherein measuring the reset voltage comprises opening a read select transistor between the second storage element and a column wire coupled to a voltage read circuit.

17. The method of claim 11, wherein transferring the charge comprises closing a first transfer transistor between the first storage element and the photodetector and opening a second transfer transistor between the first storage element and the second storage element.

18. A computing system comprising:
a processor;
a memory to store images; and
an image sensor to capture images, the image sensor having a plurality of photodetectors to produce free electrons in response to incident photons, each photodetector being coupled to a circuit, the circuit comprising a first storage element coupled to the photodetector to collect free electrons from the photodetector as an accumulated charge, a transfer switch coupled to the first storage element, a second storage element coupled to the first storage element through the transfer switch to collect the accumulated charge from the first storage element when the transfer switch is open, and a sense circuit to measure the charge on the second storage element before the accumulated charge is collected from the first storage element as a reference charge and to measure the charge on the second storage element after the accumulated charge is collected from the first storage element as a read charge, wherein the sensed charge is determined by comparing the reference charge to the read charge,
wherein the sense circuit measures the charge by connecting the second storage element to an analog to digital converter of the processor to convert the voltage of the second storage element to a digital measurement value.

19. The computing system of claim 18, wherein the reset switch is further to reset the second storage element after the reference charge is measured and before the read charge is measured.

20. The computing system of claim 18, wherein the circuit further comprises a second transfer switch between the photodetector and the first storage element to alternately allow the electrons to be collected when open and prevent the electrons from being collected when closed.

* * * * *